W. R. TURNBULL.
FLOAT FOR HYDROAEROPLANES AND THE LIKE.
APPLICATION FILED DEC. 18, 1917.
1,317,741.
Patented Oct. 7, 1919.
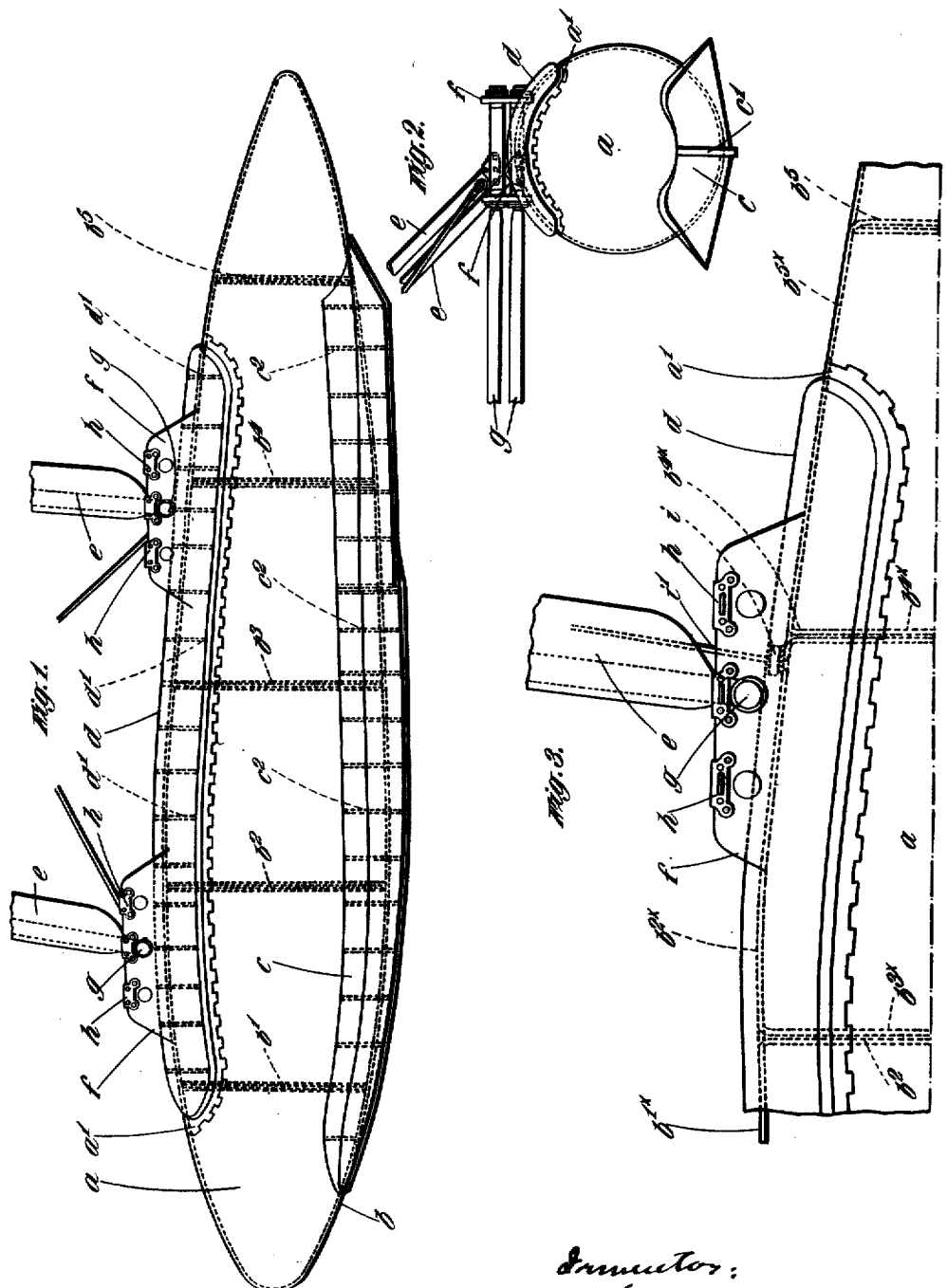

UNITED STATES PATENT OFFICE.

WALLACE RUPERT TURNBULL, OF PETERBOROUGH, ENGLAND.

FLOAT FOR HYDROAEROPLANES AND THE LIKE.

1,317,741.  Specification of Letters Patent.  Patented Oct. 7, 1919.

Application filed December 18, 1917. Serial No. 207,691.

*To all whom it may concern:*

Be it known that I, WALLACE RUPERT TURNBULL, a subject of the King of Great Britain, residing at the Royal Hotel, Peterborough, England, have invented certain new and useful Improvements in or Relating to Floats for Hydroaeroplanes and the like, of which the following is a specification.

The present invention relates to inflatable floats for hydro-aeroplanes or sea-planes and other machines and apparatus designed to alight on water of a kind heretofore proposed in which the float is constructed and arranged to act not only as a float but also as a pneumatic shock absorber, that is, the float has means of connection at its upper part to the machine or apparatus, and the object of the said invention is to render this kind of float more serviceable.

The chief features of the said invention are that the float is generally of stream-line form and has a number of independently inflatable ballonnets preferably of elastic material. Other features of the invention are that the cover for the ballonnets is of two parts detachably secured together and the float is provided with rigid members at top and bottom formed of multi-ply wood and of recessed shape on their inner side.

In order that the nature of the said invention and the manner in which it may be performed should be fully understood the said invention is hereinafter more particularly described with reference to the accompanying drawings which illustrate the preferred embodiment thereof in a main float for sea-planes.

Figure 1 of the said drawings is a side view of the float.

Fig. 2 is an end view thereof looking from the front of the float, and

Fig. 3 is a part side view of the float drawn on an enlarged scale and somewhat diagrammatically to illustrate certain parts hereinafter referred to.

In the following description the parts of the said drawings are referred to by the letters and numerals marked thereon, the same letters and numerals being used to indicate the same or similar parts in all the figures.

The outer covering of the float is formed in two parts $a$, $a'$ of canvas or similar material the said parts having staggered tabs or loops formed at their adjoining edges through which a steel wire may be passed in order to connect the parts $a$, $a'$ together or any convenient method, such as lacing may be used to attach the fabric portions together. The cover $a$, $a'$ is preferably waterproofed although it is not necessary that it should be. Within the said cover a series of six inflatable ballonnets, air bags or bladders of india-rubber $b$, $b'$, $b^2$, $b^3$, $b^4$, $b^5$ are arranged, the said ballonnets constituting the inflatable element aforesaid. The material of these ballonnets is of elastic india rubber of a nature similar to football bladders but having an initial shape approximately consistent with that they are to assume when inflated, so that they may be inflated against the elasticity of their material and when fully inflated automatically take a shape that enables each ballonnet to fill the space within the float cover which it is designed to fill and within which it is located. The cover $a$ $a'$ is of such shape that when the ballonnets are inflated the body of the float is of stream-line form as illustrated. To the lower part of the float cover there is secured a substantially rigid member or bottom piece $c$ having a keel $c'$, and to the upper part of the float cover that is, to the part $a'$ there is secured a rigid member $d$ (hereinafter termed the "saddle") which is connected to the float struts $e$, $e$. The said bottom $c$ and saddle $d$ are connected to the cover of the float by screws, tacks, strips of wood or other suitable means and are formed of recessed shape on their inner side with a skin of multi-ply wood secured on ribs or partitions of wood $c^2$, $c^2$, $d'$, $d'$ respectively, whereby great lightness is secured. $f$, $f$ are short upright projections of wood rigidly secured to the upper part of the saddle $d$ through holes in which upright projections the stays or axles $g$, $g$, by which the two main floats are connected together, are passed and secured by steel washers with rubber concussion washers interposed. To the parts of the axles $g$, $g$ between the two parts $f$, $f$ of each pair the struts $e$, $e$ are secured. Each upright $f$ is provided with a number of holes, as for example three as illustrated to receive the axles $g$, $g$ for the purpose of providing for adjustment of the relative positions of the center of gravity of the sea-plane as a whole and the center of buoyancy of the floats. $h, h$ are metal plates to strengthen the parts of the projections $f f$ above the holes in them.

The ballonnets $b, b', b^2, b^3, b^4, b^5$, have provisions whereby they are inflated independently of one another so that if one be injured the others shall not be affected and the said provisions consist of an independent lead tube to each ballonnet arranged between the upper part of the float cover and the ballonnets. The said independent lead tubes are not illustrated in Fig. 1 but are indicated in Fig. 3 in which figure: $b^{1*}$ indicates the lead tube to ballonnet $b'$; $b^{2*}$ the lead tube to ballonnet $b^2$, $b^{4*}$ the lead tube to ballonnet $b^4$ and $b^{5*}$ the lead tube to ballonnet $b^5$. The lead tubes to all the ballonnets run from a common air distributer $i$ from which a short tube (not shown) leads to the ballonnet $b^3$. The air distributer $i$ is fed through a pipe $i'$ which runs upwardly to air pumping gear in the sea-plane, the said tube $i'$ being conveniently arranged within the fairing of the rear strut $e$, as shown in Fig. 3. In order to insure even air pressure in all the ballonnets a check valve is arranged in the lead tube to each ballonnet and at some convenient part in the pumping gear or in the air distributer $i$ a safety valve is preferably arranged. From the description hereinbefore given it will be understood that the cover $a, a'$ being of practically inextensible material acts not only to inclose and retain the ballonnets but to limit the outward movement of the saddle $d$ and bottom $c$ from each other while permitting of movement toward one another.

When the sea-plane provided with main floats constructed as hereinbefore described alights on the water the bottom $c$ of each float is forced toward the saddle $d$ which is secured to the struts $e, e$ but the force of impact is conveyed to the said struts only through the medium of the ballonnets constituting the inflated element between the said bottom $c$ and saddle $d$ which inflated element thus constitutes a pneumatic cushion or shock absorber while, as the float is generally of stream-line form, air and water resistance is reduced to a minimum.

The said invention is applicable to tail floats and wing-tip floats as well as to main floats of sea-planes or hydro-aeroplanes and to all machines and apparatus that alight on the water from time to time and need floats and means to absorb the shocks of impact on alighting on the water.

What I claim and desire to secure by Letters Patent of the United States is:—

1. An inflatable float for hydro-aeroplanes and other machines and apparatus designed to alight on water, comprising in combination a cover which when inflated is of general stream line form, a connection for the machine or apparatus at the upper part of the float, and a number of independently inflatable ballonnets of elastic material within the said cover and arranged to be mutually form maintaining when inflated.

2. An inflatable float for hydro-aeroplanes and other machines and apparatus designed to alight on water, comprising in combination a main body of general stream-line form, a rigid saddle of multi-ply wood secured on the upper side of the said body and formed of a recessed shape on that side of the said saddle next the said body, and a connection for the machine or apparatus, at the said saddle.

3. An inflatable float for hydro-aeroplanes and other machines and apparatus designed to alight on water, comprising in combination a main body of general stream-line form, a connection at its upper part for the machine or apparatus, and a rigid member of multi-ply wood secured to the bottom of the float and formed of a recessed shape on that side of the said member next the said body.

4. An inflatable float for hydro-aeroplanes and other machines and apparatus designed to alight on water comprising in combination the features that the float is of general stream-line form, has a number of independently inflatable ballonnets within a cover in two parts detachably secured together, a rigid saddle of multi-ply wood at its upper part for connection to the machine or apparatus and a rigid member of multi-ply wood secured at the bottom of the float.

5. An inflatable float for hydro-aeroplanes and other machines and apparatus designed to alight on water comprising in combination the features that the float is of general stream-line form, has a number of independently inflatable ballonnets within a cover in two parts detachably secured together, a rigid saddle of multi-ply wood at its upper part for connection to the machine or apparatus and secured to one part of said cover and a rigid member of multi-ply wood secured at the bottom of the float to the other part of said cover.

WALLACE RUPERT TURNBULL.